350-6.3
7/12/83   XR   4,393,408   SR

United States Patent [19]
Beck et al.

[11] 4,393,408
[45] Jul. 12, 1983

[54] OPTOELECTRONIC DEVICE FOR ROTARY SCANNING OF VIDEOFREQUENCY IMAGES

[75] Inventors: Jean L. Beck; Jean F. le Bars; Yves A. Emmanuelli; Denis Bargues, all of Paris, France

[73] Assignee: Thomson-CSF, Paris, France

[21] Appl. No.: 311,382

[22] Filed: Oct. 14, 1981

[30] Foreign Application Priority Data

Oct. 17, 1980 [FR] France ................. 80 22275

[51] Int. Cl.³ .................. H04N 3/06; H04N 3/14
[52] U.S. Cl. ........................ 358/205; 350/6.3; 358/213
[58] Field of Search .......... 358/205, 109, 113, 213; 350/6.3

[56] References Cited

U.S. PATENT DOCUMENTS

2,957,044 10/1960 Calder ........................... 358/205
2,978,948 4/1961 Kimber ........................... 358/205
3,345,120 10/1967 Palmer ........................... 358/205
3,614,194 10/1971 Harris ............................. 358/205
3,693,042 9/1972 Fredkin .......................... 358/205

*Primary Examiner*—Howard Britton

[57] ABSTRACT

The optoelectronic rotary scanning device comprises optical receiving means, optical elements driven together in rotation by an afocal system consisting of at least two cylindrical optical elements designed to rotate about an axis perpendicular to the plane of their generator-lines, and an optical element for focusing on an array of detectors extending radially from the perpendicular axis. Videofrequency means are provided for processing the signals delivered by the detectors, the signals being multiplexed and stored sequentially in memory after transcription to cartesian coordinates. The videofrequency processing means also comprise a loop which subtracts the integrated mean value of the signals of all the detectors from each signal of each detector and a circuit for correcting thermal-drift residual voltages of the amplifying circuits of the detectors.

16 Claims, 23 Drawing Figures

OPTOELECTRONIC DEVICE FOR ROTARY SCANNING OF VIDEOFREQUENCY IMAGES

This invention relates to an optoelectronic device for scanning a videofrequency image by rotary scanning.

An optoelectronic videofrequency-image scanning device was disclosed in French Pat. No. 2,363,084. This known device comprises optical receiving means, optical elements driven in rotation so as to produce an image scan, an optical element for focusing on a detection system comprising an array of detectors and circuits for processing the videofrequency signals delivered by the detectors. Provision is made for a mirror having multiple facets and rigidly fixed to the rotor of a gyroscope, said rotor being mounted in a gimbal suspension in such a manner as to ensure that, when each facet rotates and passes through the optical path of a receiving optical system, a detection system is scanned optically in the field of vision along a first dimension. A scan along a second orthogonal dimension is carried out either by inclining each reflecting facet at a different angle with respect to the axis of rotation of the rotor or by placing a mirror in the optical path and driving said mirror in rotation. A system of this type has a disadvantage in that it entails the need for excessive bending-back of the light rays as well as eccentric positions of parts which are detrimental to stabilization of the device as a whole when it is incorporated in a gyroscope-stabilized head.

The present invention is directed to an optoelectronic videofrequency-image scanning device which makes it possible to avoid the need for bending-back of optical paths and excessive mechanical off-centering.

An optoelectronic device for scanning videofrequency images according to the invention comprises optical elements driven in rotation so as to produce an image scan, an optical element for focusing on a detection system comprising an array of detectors and means for processing the videofrequency signals delivered by said detectors. One distinctive feature of the device lies in the fact that the optical elements which are driven in rotation consist of an afocal system comprising at least two cylindrical optical elements driven together in rotation about an axis which is perpendicular to their generator-lines and defines the optic axis of the device. Another feature of the device lies in the fact that the array of detectors comprises a plurality of detectors extending from said axis. In order to scan the image, the field to be scanned is thus caused to rotate in front of at least one array of photosensitive detectors around a detector located on said axis and corresponding to the center of the field.

In one embodiment of the invention, the two cylindrical optical elements have equal focal lengths.

In an embodiment of the invention, said cylindrical optical elements consist of two cylindrical lenses having parallel generator-lines.

In an alternative embodiment, the cylindrical optical elements consist of a cylindrical mirror and cylindrical lenses having orthogonal generator-lines.

In a further embodiment, the device according to the invention is incorporated in a gyroscope-stabilized head comprising a gimbal suspension, a stator rotatably mounted on the two pivot-pins of the gimbal suspension and a rotor which is capable of rotating with respect to the stator about an axis of rotation defining a line of sight which is the optic axis of the device. The rotational motion of the gyroscope is directly utilized by mounting the cylindrical optical elements in rigidly fixed relation to the rotor. The detection system is either coupled to the stator or decoupled from this latter and controlled in such a manner as to maintain the axis of said system in parallel relation to the axis of rotation of the rotor.

In again another embodiment of the invention, the means for processing the videofrequency signals delivered by the detectors comprise a circuit for multiplexing the signals delivered by the array of detectors, a transcribing and synchronizing circuit for causing a pair of cartesian coordinates to correspond sequentially to each pair of polar coordinates, and a memory for sequentially receiving the measured values and their addresses in accordance with said cartesian coordinates.

In still another embodiment of the invention, the videofrequency means for processing the signals delivered by the detectors comprise a memory for storing the measured values of the signals delivered by each detector under reference conditions and amplified by an amplifying circuit, and a circuit for subtracting said measured values from the values corresponding to a detection of images.

In yet another embodiment of the invention, the videofrequency means for processing detected signals comprise an averaging circuit for receiving the voltages which are representative of signals delivered by each detector and for producing at its output the mean value of said signals, and a circuit for subtracting said mean value from each voltage which is representative of the signals delivered by each detector.

In again a further embodiment of the invention, the array of detectors comprises a linear assembly of detectors of different pitch and of different dimensions.

These and other features of the invention will be more apparent upon consideration of the following description and accompanying drawings, wherein.

Figures 1, 2A:
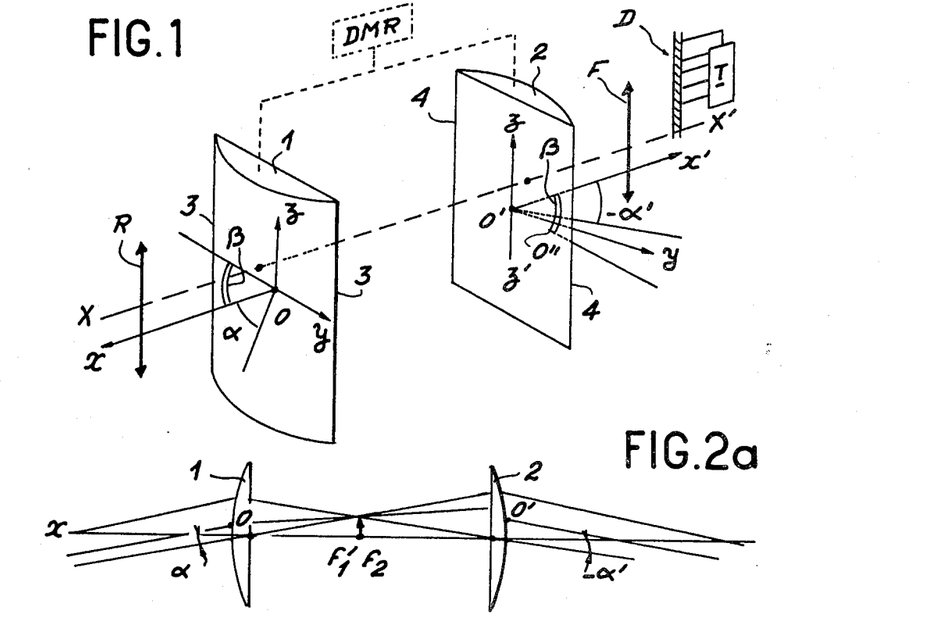
FIG. 1 is a schematic diagram which illustrates the invention.
FIGS. 2a and 2b are sectional views taken respectively along the planes xoy and xoz and illustrating two cylindrical lenses.

FIG. 1 illustrates two cylindrical optical elements 1 and 2, namely two cylindrical lenses having generator-lines 3 and 4 respectively. The two cylindrical optical elements 1 and 2 are driven in rotation and in rigidly fixed relation by means of a system designated by the reference DMR. This movement of rotation takes place about an axis X-X' at right angles to the direction of the generator-lines 3 and 4. An optical focusing element F placed downstream serves to focus the light rays issuing from the cylindrical element 2 on an array of detectors D located in its focal plane and comprising a plurality of detectors which extend from the optic axis X-X' of the system. The light rays corresponding to the scanned image are introduced at the entrance of the cylindrical optical element 1. To this end, use may be made of optical receiving means R consisting, for example, of a receiving dome and/or an optical reflecting element. As will now be shown, the combined displacement of the cylindrical optical elements 1 and 2 in rotational motion will produce rotary scanning of the image on the array of detectors D. Videofrequency means T for processing the signals delivered by the detectors are associated with the detectors of the array D.

There are also shown in FIG. 1 two light rays which are incident upon the cylindrical optical element 1 at a point O. These two light rays are inclined to the axis X-X' respectively at the angles $\alpha$ and $\beta$. The ray which is inclined to the axis X-X' at an angle $\alpha$ is located in a plane xOy at right angles to the generator-lines 3 of the optical element 1. The ray which is inclined to the axis X-X' at an angle $\beta$ is located in a plane xOz parallel to the generator-lines 3.

FIG. 2a is a view in cross-section in the plane xOy in which the cylindrical optical elements (consisting of cylindrical lenses in the case under consideration) may be assimilated with converging lenses. The two foci of the lenses shown in FIG. 2a coincide so as to form an afocal system and the light ray emerging from the lens 2 will make with this latter an angle $-\alpha'$ defined by the relation:

$$tg\, \alpha' = \frac{f_1}{f_2} tg\, \alpha$$

where $f_1$ and $f_2$ are the respective focal distances of the lens 1 and of the lens 2.

In the particular case in which these focal distances are equal, we will have $\alpha' \uparrow -\alpha$.

Figure 2B:
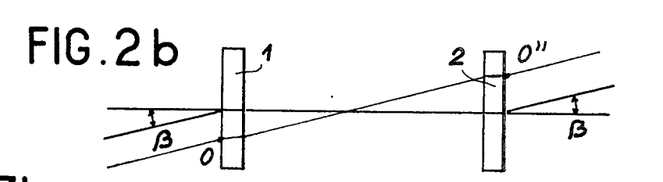

FIG. 2b is a view in cross-section along a plane which passes through the point O and is parallel to the generator-lines, namely the plane xOz. In this plane or in any plane parallel to the generator-lines, the lenses 1 and 2 are plates having parallel faces, with the result that any light ray which is incident at an angle $\beta$ with respect to the axis Ox will also emerge at an angle $\beta$. The corresponding emergent ray is shown in FIG. 1.

Figure 3A:
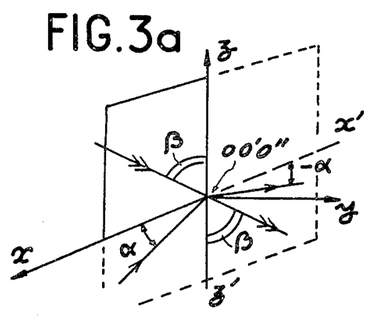
FIGS. 3a and 3b are diagrams illustrating a rotary scan.

With reference to FIG. 3a in which the points O, O' and O" coincide as represented by convention, the angular deviations of each aforementioned incident ray are shown in the case in which the focal distances of the lenses 1 and 2 are equal.

From the angular point of view, the deviations revert to the product of a symmetry with respect to a point and of a symmetry with respect to a plane which contains the axes X-X' and z-z', that is, a plane parallel to the axis of rotation X-X' of the cylindrical optical elements and to their generator-lines, and the result thereby achieved is the same as if a fictitious mirror were located in the plane xOz.

At the exit of the lens 2, a ray endowed with a movement of rotation which is duplicated with respect to the movement of rotation of the lenses 1 and 2 about the axis X-X' will consequently correspond to any incident ray at the entrance of the lens 1. A rotation of the cylindrical lenses through an angle of 90° will correspond to a rotation of the image about the detector through an angle of 180°.

Figure 3B:
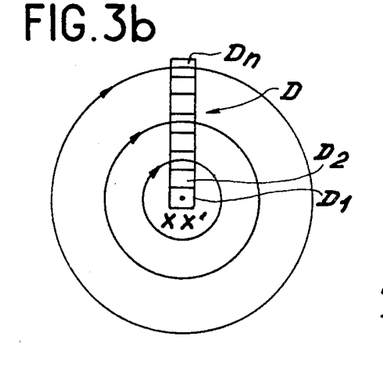

FIG. 3b shows the circular scanning obtained when the focal distances of the two lenses are equal. An array of detectors ($D_1, D_2, -D_n$) in uniformly spaced relation and extending from the axis X-X', the trace of which corresponds to an end detector $D_1$ of the array, will be scanned by rotation of the image.

In the event that the focal distances of the two lenses are not the same, the circles described by the images of the different object points are not concentric.

Figure 4:
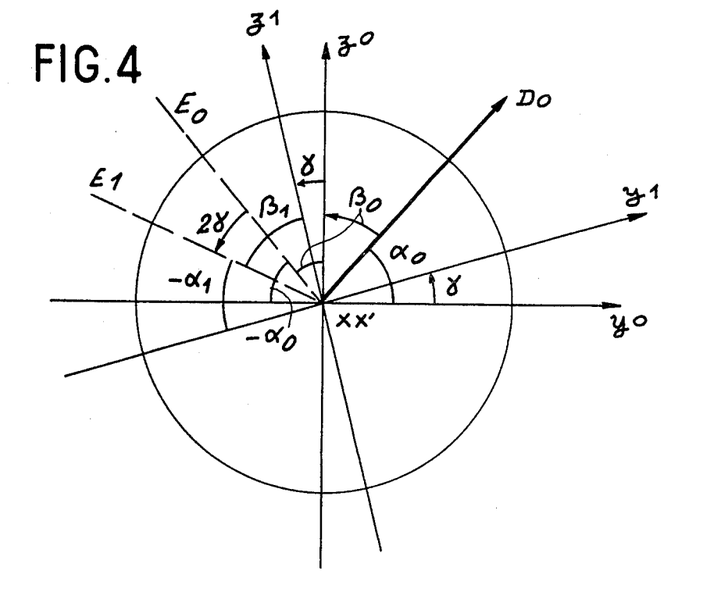
FIG. 4 is a diagram of the angular displacement at the time of rotation of the two cylindrical optical elements.

FIG. 4 is a diagram showing the angular deviations when the cylindrical optical elements rotate through an angle $\gamma$. The reference $z_o$ represents an axis parallel to the generator-lines of the cylindrical lenses and the reference $y_o$ represents an axis which is perpendicular to the axis $z_o$ and located in a plane parallel to the generator-lines. After rotation through an angle $\gamma$, said axes become respectively $y_1$ and $z_1$. The reference $D_o$ represents the direction of an object which makes an angle $\alpha_o$ with the axis $y_o$ and an angle $\beta_o$ with the axis $z_o$. The direction $E_o$ of emergence of the incident beam prior to rotation is symmetrical with the direction $D_o$ with respect to the axis $z_o$. The direction $E_1$ of emergence of the incident beam after rotation of the axes through an angle $\gamma$ makes an angle $2\gamma$ with the direction $E_o$. The direction $E_1$ makes an angle $\beta_1$ with the axis $z_1$, and we have:

$$\beta_1 = \beta_o + \gamma.$$

In the case of a rotational velocity of the cylindrical optical elements equal to $\omega$, the angular velocity of image scanning will be equal to $2\omega$.

Figure 5A:
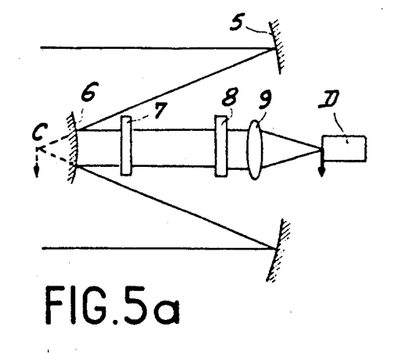
FIGS. 5a, 5b, 6a, 6b, 7a and 7b illustrate embodiments of the invention in which provision is made for an optical reflecting system for bending-back the incident light beam.
Figure 5B:
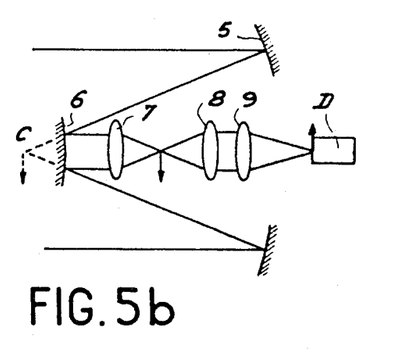

FIGS. 5a and 5b illustrate an embodiment in which the incident light rays are reflected back to the entrance of a group of two cylindrical lenses 7 and 8 by means of a beam-reflecting device of the Cassegrain type comprising a principal mirror 5 provided with an axial opening and a secondary mirror 6. A converging lens 9 focuses the light rays emerging from the cylindrical lens 8 on the detector D. The axis which passes through the center of the spherical mirror 6 and is perpendicular to the generator-lines of the cylindrical lenses 7 and 8 defines the optic axis of the system.

In FIG. 5a, which is a cross-section of the system along a plane parallel to the generator-lines of the lenses 7 and 8, the beam shown in the figure is parallel to the optic axis of the system and is converted by the set of mirrors 5 and 6 to a beam which is parallel to the optic axis of the system.

By virtue of the fact that, in the plane parallel to the generator-lines, the cylindrical lenses 7 and 8 are comparable with plates having parallel faces, the parallel beam will be focused on the detectors by the converging lens 9. A virtual image will therefore be produced at the center of the spherical lens 6 and a real image having the same direction will be focused on the detectors.

In FIG. 5b, which is a cross-section along a plane perpendicular to the generator-lines of the cylindrical lenses 7 and 8, the beam which is parallel to the optic axis is also reflected back by the set of mirrors 5 and 6 in the form of parallel rays. The cylindrical lens 7 which is comparable in this plane with a converging lens will focus these rays in its focal plane and the cylindrical lens 8 will re-convert the rays to a beam which is parallel to the optic axis. The beam will pass through the converging lens 9 and will be focused on the array of detectors D. There will therefore be produced a virtual image at the center C of the spherical mirror 6, a real image having the same direction at a distance equal to the focal distance of the lens 7, and a real image of opposite direction at the level of the detector.

Figure 6A:
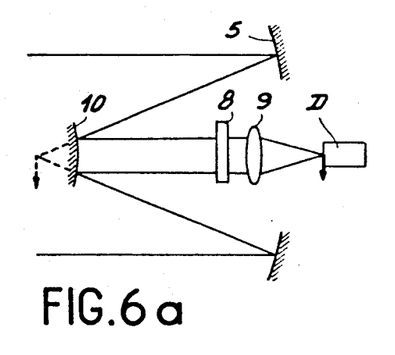
Figure 6B:
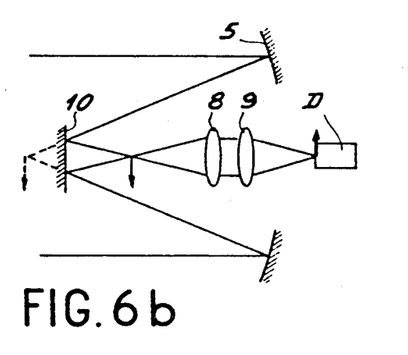

FIGS. 6a and 6b illustrate a variant of FIGS. 5a and 5b in which a cylindrical mirror 10 is substituted for the spherical mirror 6 and the cylindrical lens 7. The generator-lines of said cylindrical mirror 10 are perpendicular to the generator-lines of the cylindrical lens 8.

In FIG. 6a, which is a cross-section along a plane parallel to the generator-lines of the cylindrical lens 8, a beam parallel to the optic axis of the system is reflected back in the form of a parallel beam from a cylindrical mirror 10 which is comparable with a spherical mirror in this plane. The parallel beam passes through the cylindrical lens 8 which is comparable in this plane with a plate having parallel faces and is then focused on the array of detectors D by the converging lens 9. A virtual image is therefore produced in this plane at the level of a point corresponding to the center of the cylindrical mirror 10. A real image is produced at the level of the array of detectors and has the same direction as the other image.

In FIG. 6b, which is a cross-section along a plane perpendicular to the generator-lines of the cylindrical lens 8, a beam parallel to the optic axis of the system is reflected back by the cylindrical lens 10 which, in this plane, is comparable with a plane mirror. Said beam is convergent in a plane corresponding to the focus of the cylindrical lens 8 which is comparable in this plane with a converging lens and forms at the exit of this latter a parallel beam which passes through the converging lens 9 and is focused on the array of detectors D. There are therefore produced a virtual image located at a point of the focus of the cylindrical lens 8 which is symmetrical with respect to the trace of the cylindrical mirror 10, a real image having the same direction at the focus of the cylindrical lens 8, and a real image of opposite direction at the level of the detectors.

Figure 7A:
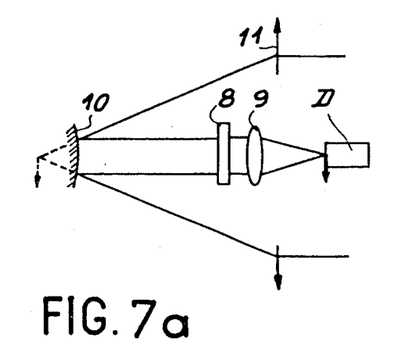
Figure 7B:
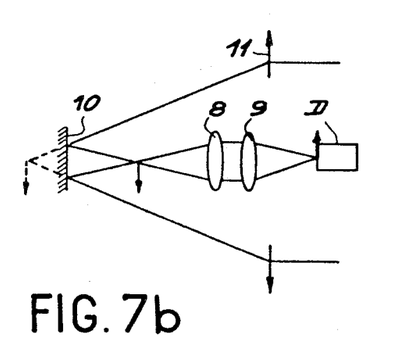

FIGS. 7a and 7b are variants of FIGS. 6a and 6b in which the principal mirror 5 is replaced by a converging lens 11 provided with an axial aperture. The optical diagrams shown correspond to those of FIGS. 6a and 6b. It will readily be apparent that a substitution of this type is also possible in the case of FIGS. 5a and 5b.

Figure 8:
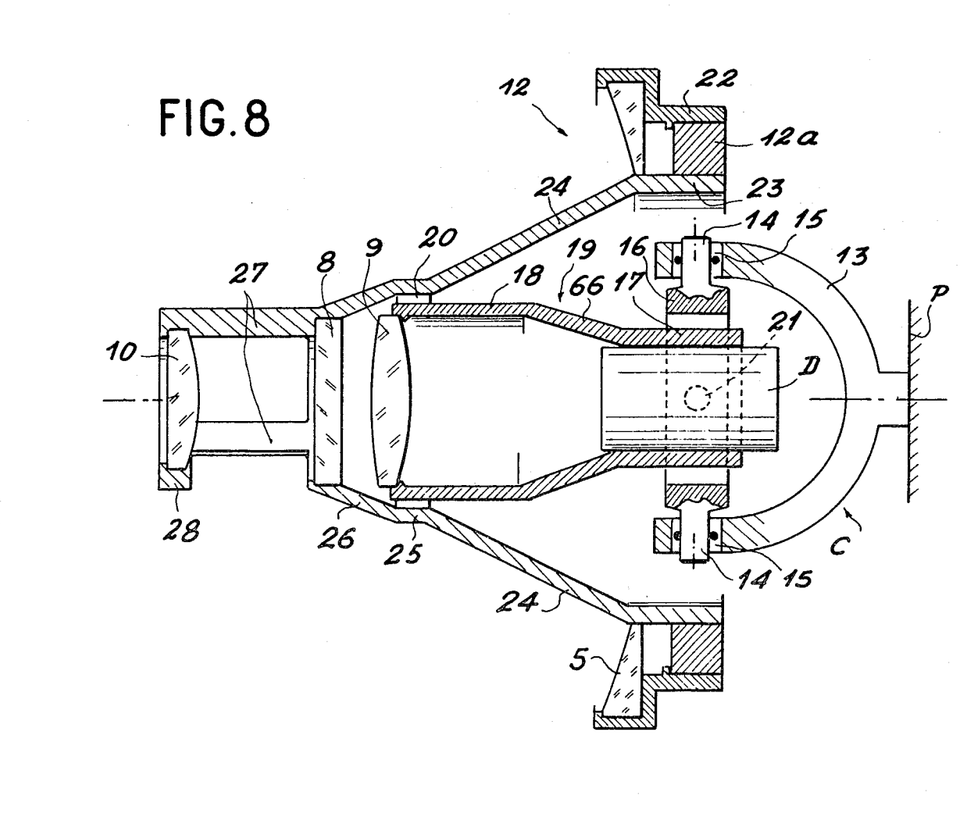
FIGS. 8 and 9 illustrate a device according to the invention which is integrated in a homing unit provided with a gimbal suspension which is respectively of the internal and external type.

FIG. 8 illustrates a device according to the invention which is incorporated in a gyroscope-stabilized head. The gyroscope comprises a gimbal suspension designated by the general reference C, a stator 19 which is capable of pivotal displacement about two pins 14 and 21 of the suspension C, and a rotor designated by the general reference 12.

The gimbal suspension C comprises a yoke 13 which is secured to a reference plane P. The yoke 13 is adapted to carry a first gimbal pin 14 designed in two parts and rotatably mounted in bearings 15. A ring 16 rigidly fixed to or integral with the gimbal pin 14 is adapted to carry a second gimbal pin 21 also designed in two parts and located at right angles to the first. Said second pin 21 is capable of moving around the ring by means of bearings (not shown) and is rigidly fixed to the stator 19 at the level of the support 17. Said support 17 serves to maintain a casing which encloses an array of detectors and is designated by the general reference D. The stator 19 is also composed of a support 17 and of a front cylindrical portion 18 joined to said support by a junction cone 66. A converging lens 9 is set in the extremity of the cylindrical portion 18.

The rotor, designated by the general reference 12, rotates around the stator by means of bearings 20 mounted externally of the front cylindrical portion 18. Said rotor is composed of a gyro wheel 12a and of a principal mirror 5 mounted externally of the gimbal C; these two elements are rigidly fixed to a coupling member 23 of generally cylindrical shape by means of a retaining assembly 22. The coupling member 23 is extended by a junction cone 24 to a cylindrical profile 25 which is adapted to cooperate with the bearing 20. The cylindrical profile 25 has an extension consisting of a junction cone 26, the extremity of which is adapted to carry a cylindrical lens 8. The junction cone 26 is extended by supporting arms 27 which are adapted to carry a cylindrical mirror 10 by means of a mounting ring 28.

The complete assembly defines an optical system, the optic axis of which coincides with the axis of the bearing 20. When the direction of the reference plane P is caused to change, the optical system always remains aligned with the axis defined by rotation of the gyroscope.

Figure 9:
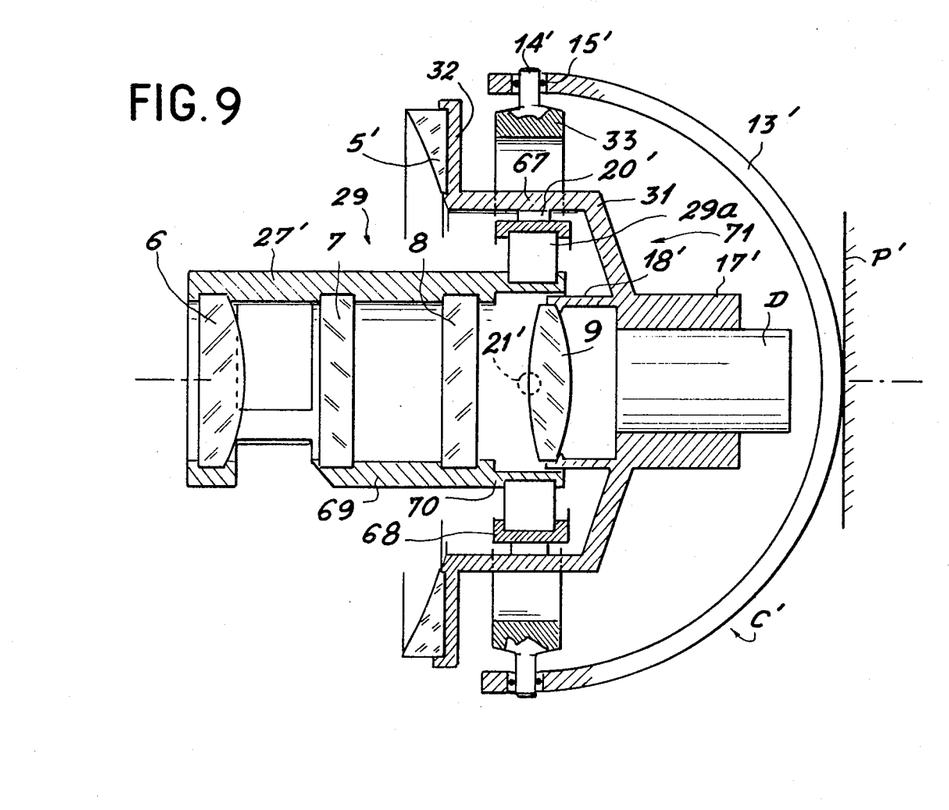

FIG. 9 is a variant of FIG. 8 in which the gimbal suspension C is of the external type and in which the principal mirror is rigidly fixed to the stator of the gyroscope. The gimbal C' is provided with a yoke 13' which is integral with a reference plane P'. A two-part gimbal pin 14' is carried by the yoke 13' and rotatably mounted in a bearing 15'. A ring 33 rigidly fixed to the gimbal pin 14' is adapted to carry a two-part gimbal pin 21'. Said pin 21' is perpendicular to the pin 14' and is mounted for rotation about the ring 33 by means of a roller-bearing (not shown). The two-part gimbal pin 21' is rigidly fixed by means of a cylindrical portion 67 to a stator which is designated by the general reference 71. The cylindrical portion 67 is extended towards the rear by a junction cone 31 and a support 17' in rigidly fixed relation to an array of detectors D. The support 17' also has a junction surface 18' which is adapted to carry the converging lens 9. The cylindrical surface 67 also has a forward extension in the form of a retaining member 32 and this latter is adapted to carry a principal mirror 5' which defines a so-called Cassegrain system with the mirror 6.

The rotor designated by the general reference 29 is caused to rotate at the level of the cylindrical portion 67 within a bearing 20'. The outer portion of the gyro wheel 29a of the rotor 29 is adapted to carry a retaining assembly 68 which cooperates with the roller-bearing 20'. The gyro wheel 29a is carried by the extension 70 of a mounting tube 69 in which the cylindrical lenses 7 and 8 are set. The spherical mirror 6 is carried by supporting arms 27' which are rigidly fixed to the mounting tube 69.

Figure 10:
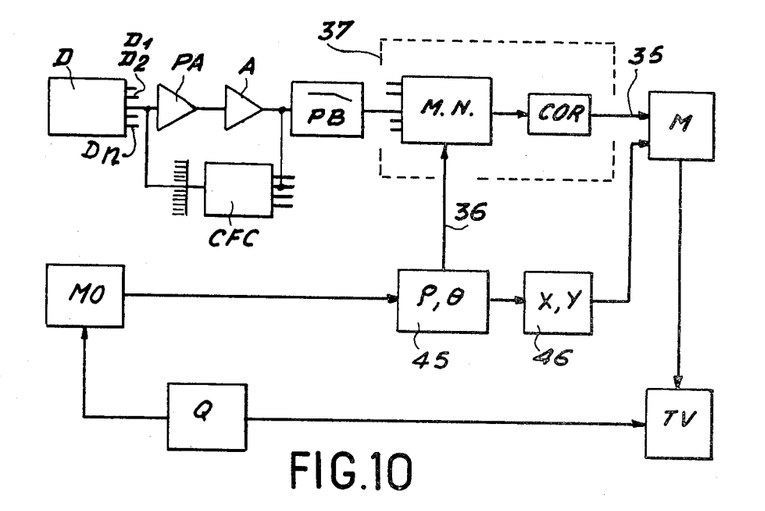
FIG. 10 is a general diagram showing the means for processing videofrequency signals delivered by the detectors.

FIG. 10 illustrates an electronic assembly for videofrequency processing of detecting signals. There is associated with each detector an amplifying circuit composed of a preamplifier PA and of an amplifier A, a continuous-background corrector CFC which eliminates the direct-current components of the measuring signals and a low-pass filter PB for limiting the passband and therefore improving the signal-to-noise ratio.

By virtue of the properties of rotary scanning, the passband in respect of a given detector can be smaller in width as it is nearer the center of the field which is located on the axis of rotation.

The amplified and filtered voltages are introduced into a multiplexing and correcting unit 37. This unit comprises a multiplexing and digital coding circuit MN and a circuit COR for correcting residual voltages. The measured values are fed sequentially into a memory M via a bus line 35. Sampling of the signals is synchronized for example from a quartz crystal unit Q which controls a motor MO for driving the optical elements in rotation in a manner known per se. The image to be scanned is divided into a certain number of sectors, the sector angle of which corresponds to the angle of rotation of the optical field during the time chosen to carry out multiplexing of the signals delivered by the n detectors. Synchronization signals are fed into a $\rho, \theta$ polar-coordinate sequencer which is designated by the reference 45 and connected via a line 36 to the multiplexing and digital coding circuit MN. A pair of cartesian coordinates X and Y corresponds to a pair of polar coordinates $\rho$ and $\theta$ representing a given position of the rotating optical elements which, as a first approximation, is assumed to be constant during multiplexing of the signals of the n detectors. An XY transcribing unit designated by the reference 46 ensures correspondence between the polar coordinates and cartesian coordinates and feeds the corresponding values of the cartesian coordinates into the memory M in response to a control provided by the synchronization mentioned earlier and corresponding to the beginning of further multiplexing of the n detectors. The measured values will thus be stored in memory, for example line by line and image by image, in accordance with a table corresponding to cartesian coordinates. A TV video processing unit which is preferably synchronized by the quartz crystal unit Q will generate sequentially line-by-line television images.

Figure 11:
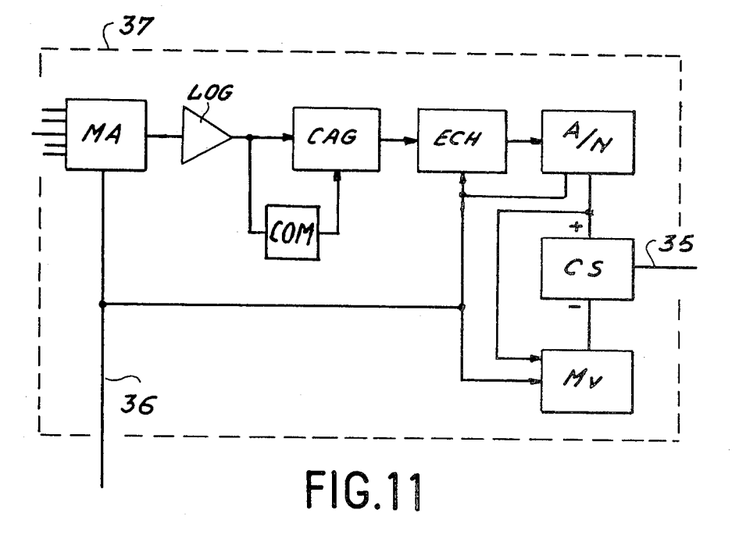
FIG. 11 illustrates a unit for multiplexing and correcting residual voltages.

One embodiment of the multiplexing and correcting unit 37 is shown in FIG. 11 and comprises:

a multiplexing analog circuit MA which receives at its input an amplified signal delivered by the detectors;

a logarithmic amplifier LOG having the function of compressing the signals corresponding to very luminous objects in order to prevent saturation;

an automatic gain control circuit CAG which receives control signals from the output of the logarithmic amplifiers LOG via a control circuit COM;

a sampling circuit ECH in which the signals derived from automatic gain control circuits CAG are read by sampling and fed sequentially into an analog-to-digital converter A/N;

a substracting circuit CS for receiving at its input the output signals of the analog-to-digital converter A/N and signals stored in a memory $M_y$ and corresponding to the values of the signals delivered by each detector under reference conditions;

a synchronization provided by a line 36 and distributed to the circuits MA, ECH, A/N and $M_y$.

By means of the subtracting circuit CS, the contents of the memory $M_y$ relating to the corresponding detector are subtracted sequentially from each value measured by each detector. As will be explained in greater detail hereinafter, the design function of said subtracting circuit is to permit initialization of all the detectors prior to turn-on of the devices, or at predetermined time intervals.

In fact, in optical scanning devices of the line-by-line type employed in the prior art as described, for example, in French Pat. No. 2,363,084, a pattern corresponding to a uniform distribution of the luminous flux on all the detectors is placed in front of these latter at the end of each scan corresponding to an image and the signals delivered by each detector are corrected in the case of each image scan by subtracting the stored value corresponding to the pattern from each value measured by each detector. This initialization is carried out periodically and permits the use of preamplifiers provided with an input capacitor which retains the direct-current components of the signals. Periodic initialization permits recalibration of each measuring chain prior to each image scan, thus making it possible to remove the direct-current components of the signals and to compensate for thermal drift, especially of the first stage of amplification of the signals of each detector without, however, impairing restitution of the image. At the time of an image scan, the time constants of the preamplifier inputs are accordingly chosen so as to ensure that direct-current signals are not reduced in strength by more than 1% during one image-scanning period.

The application of this principle of initialization to an optoelectronic device for scanning images by rotary sweeping would entail the loss of part of the image, especially in the central zone.

The subtracting circuit CS described in the foregoing with reference to FIGS. 10 and 11 makes it possible to circumvent this drawback.

Initialization permits elimination of residual voltages corresponding to drift and especially thermal drift of the inputs of the amplifying circuits and especially of the preamplifiers of the detectors; said initialization is performed once and for all when the device is put into service, or at intervals of N images, where N is a function of tolerated drift. Initialization is performed by subjecting all the detectors to a uniform flux, for example by occultation of the system. The values measured by each detector under these predetermined conditions are stored in the memory $M_y$ and then subtracted from the values measured by the corresponding detectors, said values being sampled at the time of an image detection.

As will be clearly apparent, the initialization operation mentioned above can also be carried out by making use of known analog devices for performance of the memory function at the time of initialization and then making use of amplifiers and coupling logic in order to perform the subtraction operation.

Figure 12:
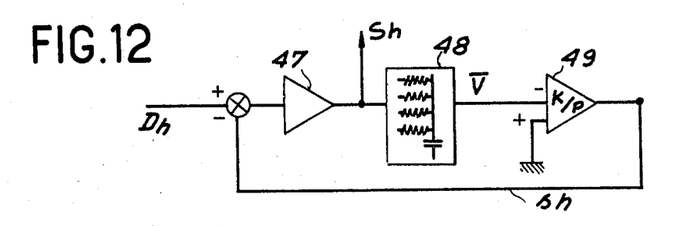
FIG. 12 is a diagram which illustrates an averaging circuit.
Figure 13:
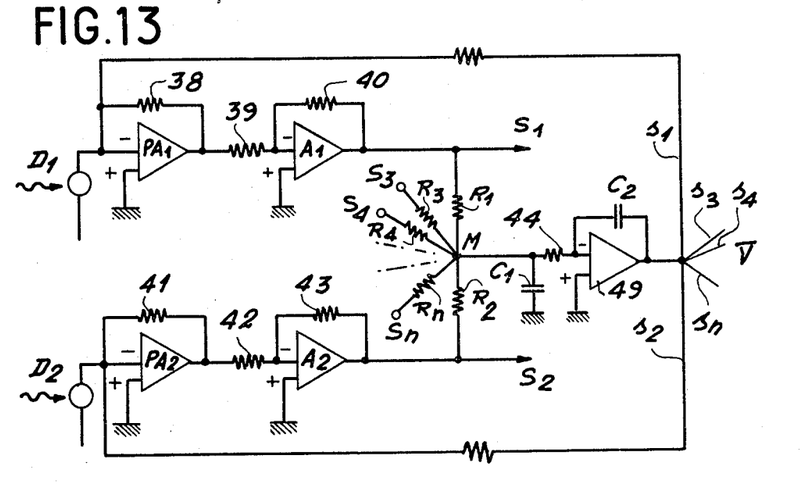
FIG. 13 illustrates one embodiment of the averaging circuit shown in FIG. 12.
Figure 14A:
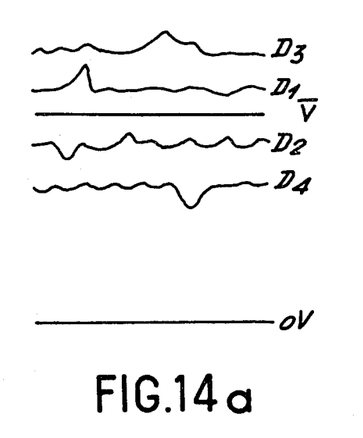
FIGS. 14a and 14b are representative of the action of an averaging circuit on output signals of the detectors.
Figure 14B:
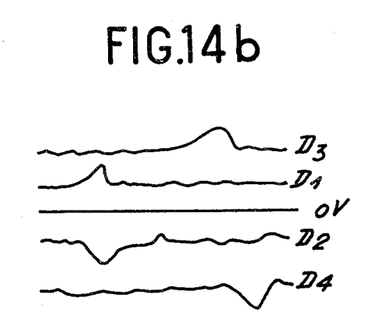

Referring to FIGS. 12 to 14, there will now be described one embodiment of the correcting circuit CFC which subtracts the mean direct-current component from all the signals. This arrangement is particularly advantageous in the event that infrared detectors are employed. Since initialization of the detectors may not take place periodically but once and for all, it is in fact difficult to employ in this case preamplifiers provided with an input capacitor. This arises from the fact that, if a zone of large area and low but constant contrast appears in the image, it could only produce direct-current signals at the time of scanning and irrespective of its light intensity, said signals being reduced in strength with a predetermined time constant. This would result in impairment and loss of contrast of the image. In accordance with the invention, the preamplifiers employed are therefore not provided with an input capacitor and the mean direct-current component of the image is eliminated.

Referring now to FIG. 12, a signal corresponding to a detector $D_h$ is fed into an amplifying circuit 47. The signals delivered by the amplifier 47 are fed into an averaging circuit 48 which also receives signals from all the other detectors which form the array. Said circuit 48 produces at its output a mean value $\overline{V}$ and this value is fed into an amplifier 49 which may be an integrating amplifier, the output signal $s_h$ of which is returned as negative feedback to the input of the amplifier 47. The system will control the output of the amplifier 47 designated by the reference $S_h$ so as to cause delivery of a signal which is centered with respect to the mean value of all the signals.

FIG. 13 shows an embodiment of the diagram of FIG. 12. A signal produced by a detector $D_1$ is fed to the negative input of a preamplifier PA1 comprising a negative feedback resistor 38. The signals at the output of the amplifier PA1 are fed into an amplifier A1 comprising an input resistor 39, a negative feedback resistor 40 as well as an output $S_1$.

The signals delivered by a detector $D_2$ are applied to the negative input of a preamplifier PA2 comprising a negative feedback resistor 41. The signals delivered by the preamplifier PA2 are fed to an amplifier A2 comprising an input resistor 42 and a negative feedback resistor 43 as well as an output $S_2$. The outputs $S_1$, $S_2$, $S_3$, $S_4$, ... $S_n$ which correspond to measuring chains, the gains of which have been adjusted so as to correspond to generally equal gains, are connected to a common point M through resistors having equal values and designated respectively by the references $R_1$, $R_2$, $R_3$, $R_4$, ... $R_n$, a capacitor $C_1$ being placed between said common point M and ground. The point M is also connected to the negative input of an integrator 49 comprising an input resistor 44 and a negative feedback capacitor $C_2$. The output of the integrator 49 is connected via resistive lines $s_1$, $s_2$, $s_3$, $s_4$, ... $s_n$ to the negative inputs of the preamplifiers corresponding in each case to the detectors which constitute the array of detectors.

FIG. 14a shows amplified signals delivered by a system comprising four detectors $D_1$, $D_2$, $D_3$, $D_4$. It is apparent that the mean value is located at a value $\overline{V}$ which is very different from the zero-volt level.

FIG. 14b shows the signals corresponding to the detectors $D_1$, $D_2$, $D_3$, $D_4$ when a circuit of the type described in FIGS. 12 and 13 is employed. The values shown are centered around the zero-volt value. The direct-current component of the signals has thus been eliminated without impairing the relevant direct-current information of the signals.

It is worthy of note that the circuit described in the foregoing is fabricated by means of analog techniques. As will readily be understood, digital techniques based on the same diagram also come within the scope of the invention. In fact, each of the operations described in FIGS. 12 and 13 can readily be transposed in the event that a processing operation of the type described is performed on signals which have been converted to the digital mode.

Figure 15A:
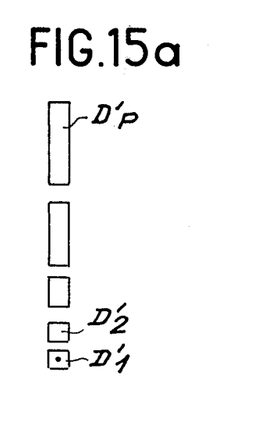
FIGS. 15a and 15b illustrate alternative embodiments of the detection system according to the invention.
Figure 15B:
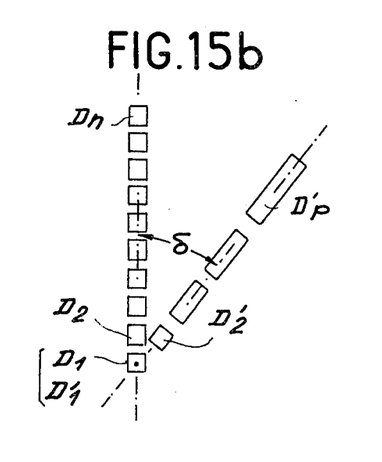

FIGS. 15a and 15b illustrate variants of detector arrays according to the invention.

FIG. 15a illustrates a linear array of detectors comprising a central detector $D'_1$ placed on the axis of rotation of the cylindrical optical elements. The following detectors $D'_2 \ldots D'_p$ are of increasing dimensions and pitch as they are located at a greater distance from the detector $D'_1$. In the event that the device is essentially employed as a sighting device, the resolution is thus fine at the center of the field and relatively coarse at the edge of the field.

FIG. 15b shows an array of detectors in which two types of linear arrays are associated, namely a first series of detectors $D_1$, $D_2$, ... $D_n$ which are spaced radially at a constant pitch and with which is associated an array of detectors $D'_1$, $D'_2$, ... $D'_p$ as shown in FIG. 15a. In the example illustrated in FIG. 15b, the detectors $D_1$ and $D'_1$ are identical. The two arrays of detectors are inclined to each other at an angle $\delta$. The linear arrays can be sensitive in different spectral bands.

When provision is made for a plurality of detectors constituting arrays which are carried by the stator of a gyroscope, a disadvantage arises from the large number of lead-out connections required, for example, for supply leads, signal-carrying leads, leads to detector cooling circuits, and so on, the combined effect of which is to introduce precession in the movement of rotation of the gyro wheel of the rotor, thereby entailing a potential danger of a sighting error.

Figure 16:
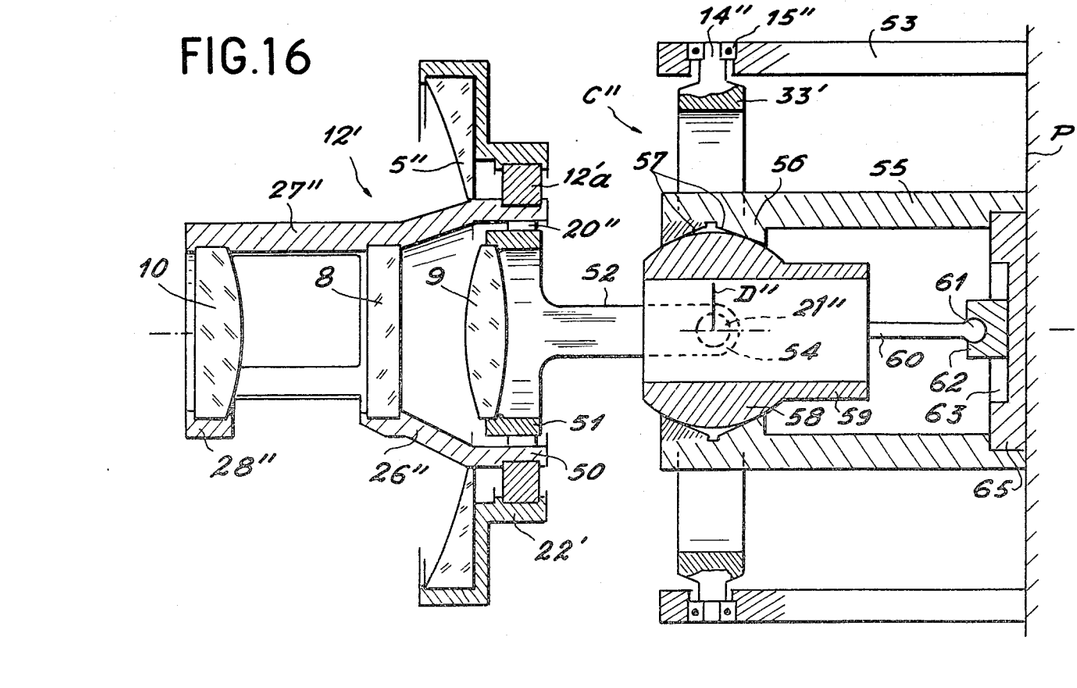
FIG. 16 illustrates a variant of FIGS. 8 and 9 in which the detection system is decoupled from the stator of a gyroscope.

Referring now to FIG. 16, there is shown an embodiment in which the detection system is decoupled from the gyroscope.

A gimbal suspension designated by the general reference C'' comprises a sleeve 53 which is rigidly fixed to a reference plane P''. The sleeve 53 is adapted to carry a two-part gimbal pin 14'' which is freely rotatable by means of bearings 15''. A ring 33' is rigidly fixed to the pin 14''. The ring 33' is adapted to carry a two-part gimbal pin 21'' and is freely rotatable with respect to the ring 33' by means of bearings (not shown). The two-part pin 21'' is rigidly fixed to a pair of coupling rods 52 which is extended in the forward direction by a ring 51 which serves to hold the converging lens 9 and is adapted to cooperate with a bearing 20'' of a rotor 12'.

The rotor 12' has a cylindrical portion 50 which is adapted to cooperate with the bearing 20'' and supports a gyro wheel 12'a and a principal mirror 5''. The gyro wheel 12'a and the principal mirror 5'' are held in position by means of a retaining assembly 22'. The cylindrical portion 50 is extended by a junction cone 26'' in the forward direction up to an inset cylindrical lens 8. The junction cone 26'' has an extension in the form of arms 27'' which are adapted to carry a cylindrical mirror 10 by means of a mounting ring 28''.

An array of detectors D'' placed at right angles to the axis of the detection system is rigidly fixed to a spherical center-bearing member 58 which is rotatably mounted by means of a double frusto-conical profile 57 formed in the front portion 56 of a sleeve 55 which is rigidly fixed to the reference plane P''. The center of rotation of the spherical bearing member 58 is preferentially the point of intersection of the two pins 14'' and 21'' of the gimbal suspension C''. The spherical center-bearing member has an extension in the form of a rear sleeve 59, said sleeve being adapted to carry a rod 60 which is provided with a ball-joint 61 and is capable of axial displacement. The ball-joint 61 is coupled to a linear motor support 62 which is capable of displacement in sliding motion along a first axis within a groove 63. Said groove is formed in a moving head 65 which is displaceable along an axis at right angles to the axis of the groove 63 by means of a linear motor.

The linear motors are controlled by a device for transcribing the position of the optic axis of the device or line of sight which is constituted by the axis of rotation of the rotor 12', and by a device for transcribing the axis of the detection system which is the axis of the spherical center-bearing member 58 and of the sleeve 59. The signals which are representative of the angular difference between the two axes are suitably fed into control circuits corresponding to each linear motor.

To this end, it is an advantage to make use of transcription and control devices of the type employed in homing heads of missiles, the design function of which is to compensate for any angular difference between the line of sight, which is the optic axis of the system mounted on a gyroscope, and the axis of the missile. The axis of the detection system is thus constrained to remain parallel to the axis of rotation of the rotor 12' or in other words the line of sight. In consequence, the array of detectors D" is constrained to remain perpendicular to said line of sight. A precision of the order of one degree of angle is obtained without difficulty and is sufficient.

The invention is primarily applicable to the homing heads of missiles and thus permits fine reconstruction of the video image of a target, especially in the field of infrared video display.

What is claimed is:

1. An optoelectronic device for scanning videofrequency images comprising optical elements driven in rotation so as to produce an image scan, an optical element for focusing on a detection system comprising at least one array of detectors and videofrequency means for processing the signals delivered by the detectors, wherein the optical elements which are driven in rotation consist of an afocal system comprising at least two cylindrical optical elements driven together in rotation about an axis which is perpendicular to the plane of their generator-lines and defines the optic axis of the device, and wherein the array of detectors comprises a plurality of detectors extending radially from said perpendicular axis, one of said detectors being centered on said axis.

2. A device according to claim 1, wherein said two cylindrical optical elements have equal focal lengths.

3. A device according to claim 1 or claim 2, wherein said cylindrical optical elements consist of two cylindrical lenses having parallel generator-lines.

4. A device according to claim 3, wherein said device comprises optical receiving means constituted by a primary mirror or a converging lens provided with an axial aperture, and a secondary spherical mirror for reflecting back to said cylindrical lenses.

5. A device according to claim 1 or claim 2, wherein said cylindrical optical elements are constituted by a cylindrical mirror and a cylindrical lens having orthogonal generator-lines.

6. A device according to claim 5, wherein said device comprises optical receiving means constituted by a mirror or a spherical lens provided with an axial aperture, for reflecting back to said cylindrical mirror.

7. A device according to claim 1, wherein said device is incorporated in a gyroscope-stabilized head comprising a gimbal suspension, a stator rotatably mounted on the two pivot-pins of the gimbal suspension and a rotor which is capable of rotating with respect to the stator and the axis of rotation of which defines the optic axis of the device, wherein the cylindrical optical elements are rigidly fixed to the rotor and wherein the detection system is rigidly fixed to the stator.

8. A device according to claim 1, wherein said device is incorporated in a gyroscope-stabilized head comprising a gimbal suspension, a stator rotatably mounted on the two pivot-pins of said gimbal suspension and a rotor which is capable of rotating with respect to said stator and the axis of rotation of which defines the optic axis of the device, wherein the cylindrical optical elements are rigidly fixed to the rotor and wherein the detection system is decoupled from the stator and controlled so that the axis of said system remains parallel to the optic axis.

9. A device according to claim 8, wherein the detection system is capable of rotating about the point of intersection of the two pivot-pins of the gimbal suspension, wherein said device is rigidly fixed to a ball-joint constrained to follow a displacement along two orthogonal axes, the displacement being produced by motors which receive signals representing the angular difference between the lines of sight and the axis of the detection system, said signals being transmitted to said motors by means of devices for transcribing the position of the line of sight and the position of said detection system.

10. A device according to claim 1, wherein the videofrequency processing means comprise a circuit for multiplexing and digital coding of the signals delivered by the array of detectors, a transcribing and synchronizing circuit for causing a pair of cartesian coordinates to correspond sequentially to each pair of polar coordinates, and a memory for sequentially receiving the measured values and their addresses in accordance with said cartesian coordinates.

11. A device according to claim 1, wherein the videofrequency processing means comprise a memory for storing the values of the signals delivered by each detector under reference conditions and amplified by an amplifying circuit, and a circuit for subtracting said values from those corresponding to an image detection so as to permit compensation for drift produced by the inputs of the amplifying circuits.

12. A device according to claim 1, wherein the videofrequency processing means comprise an averaging circuit for receiving the voltages which are representative of the signals delivered by each detector and producing the mean value of said signals at the output of said circuit, and a circuit for subtracting said mean value from each voltage which is representative of the signals delivered by each detector.

13. A device according to claim 12, wherein said device comprises an integrator which receives said mean value at its input and wherein the output of said integrator is connected to the input of said subtracting circuit.

14. A device according to claim 12 or claim 13, wherein the averaging circuit comprises an array of resistors having a common terminal, a voltage which is representative of a signal delivered by a detector being applied to the other terminal of each resistor, a capacitor connected to the common terminal and to ground and a connection between the common terminal and the input of an amplifier, and wherein the subtracting circuit comprises a negative feedback loop for reinjecting said mean value at the input of each amplifying circuit corresponding to each detector.

15. A device according to claim 1, wherein the array of detectors comprises at least one linear assembly of detectors of different pitch and of different dimensions.

16. A device according to claim 1, wherein the detector is constituted by a plurality of linear assemblies of detectors having different spectral sensitivities.

* * * * *